UNITED STATES PATENT OFFICE.

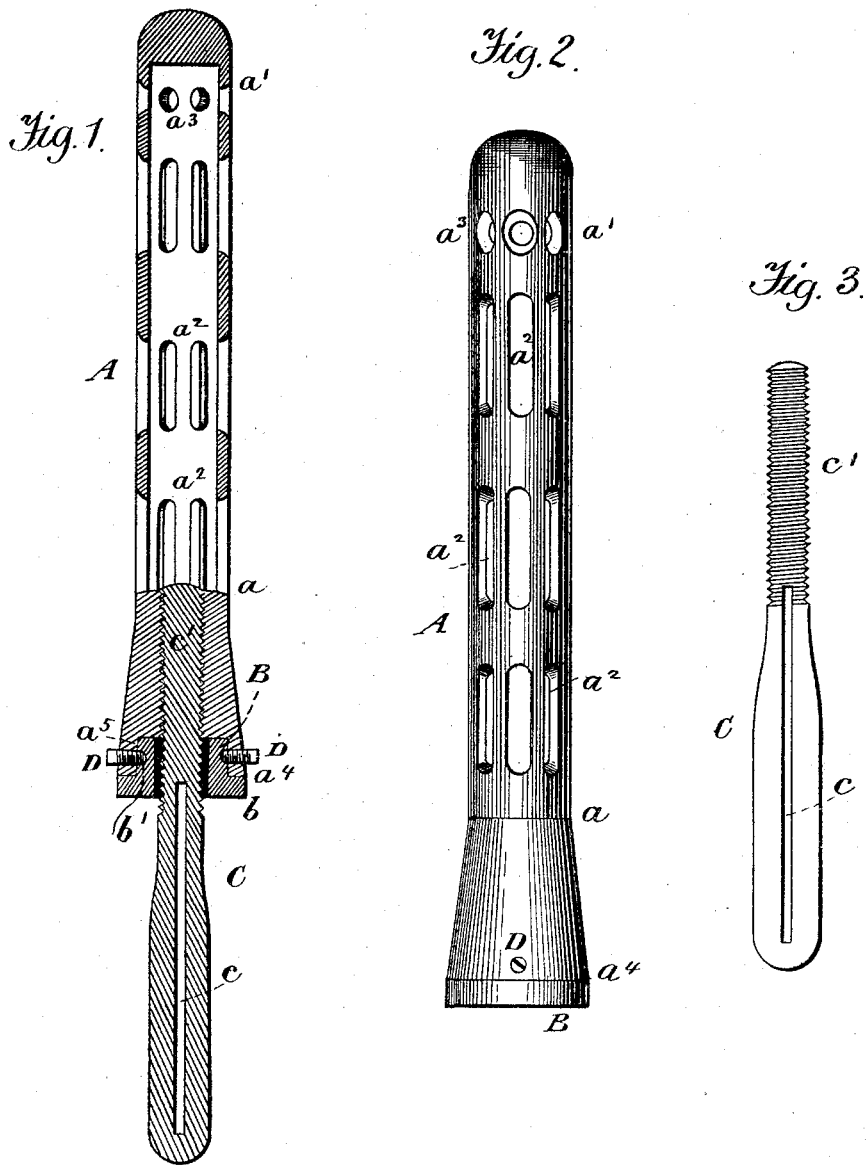

LEVI OLMSTEAD, OF JERSEY SHORE, PENNSYLVANIA.

METAL HANDLE FOR CROSSCUT-SAWS.

SPECIFICATION forming part of Letters Patent No. 458,552, dated August 25, 1891.

Application filed January 9, 1890. Serial No. 336,385. (No model.)

*To all whom it may concern:*

Be it known that I, LEVI OLMSTEAD, a citizen of the United States, residing at Jersey Shore, in the county of Lycoming and State of Pennsylvania, have invented certain new and useful Improvements in Metal Handles for Crosscut-Saws; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a saw-handle of solid malleable metal, with a female thread in the lower end to receive the threaded end of the bolt and an annular groove or rabbet near the bottom to receive a flanged and swiveled bearing.

Figure 1 of the drawings is a vertical section through the middle of saw-handle, the bolt, and the bearing; Fig. 2, an elevation of the handle and the bearing without the bolt, and Fig. 3 an elevation of the bolt which connects the saw and handle.

In the drawings, A represents the handle, B the bearing, and C the bolt. The bolt has the slot $c$ to receive the saw-blade and the end thread $c'$, the whole being old and well known, for connecting a saw-blade with its handle. The handle A is cast in one piece with a thin shell from $a$ to $a'$, slotted at $a^2$, and having holes $a^3$. It is thus made very light, and gives a firm hold to the hands, both of which grasp the handle of a crosscut-saw, for which my invention is intended. The lower part from $a$ to $a^4$ is made of larger diameter and solid walls, the latter threaded on the inside to receive the thread $c'$ of the bolt and provided at the bottom with an annular rabbet $a^5$ to receive the bearing B. The latter has the bottom flange $b$ and the annular groove $b'$, into which pass the ends of the opposite screws D D, by which said bearing is swiveled. Of course swiveled bearings to rest upon the saw-blade while the handle is turned on the screw are not at all new, the same being described in Patent No. 154,000, granted to Atkins on the 11th of August, 1874; but

What I claim as new, and desire to protect by Letters Patent, is—

A crosscut-saw handle consisting of a thin apertured metallic shell from $a$ to $a'$ and having the part from $a$ to $a^4$ made thick with an interior thread, the lower end being provided with an interior rabbet and screw-hole at its side, a threaded slotted saw-holding bolt, a grooved bearing B, and a screw D, as shown and described.

In testimony whereof I affix my signature in presence of two witnesses.

LEVI OLMSTEAD.

Witnesses:
A. F. MARTIN,
H. H. MARTIN.